United States Patent [19]

Chodnekar et al.

[11] 3,821,284

[45] June 28, 1974

[54] ALKYL OXYBENZOIC ACID ESTERS

[75] Inventors: Madhukar Subraya Chodnekar, Basel; Albert Pfiffner; Norbert Rigassi, both of Arlesheim; Ulrich Schwieter, Reinach; Milos Suchy, Basel, all of Switzerland

[73] Assignee: Hoffman-La Roche Inc., Nutley, N.J.

[22] Filed: Mar. 30, 1970

[21] Appl. No.: 23,985

[30] Foreign Application Priority Data

Apr. 30, 1964 Switzerland.................... 6597/69

[52] U.S. Cl....... 260/473 R, 260/468 J, 260/468 K, 260/470, 260/471 R, 260/473 S, 260/652 R, 260/654 R, 424/308, 424/309
[51] Int. Cl............................................. C07c 8/92
[58] Field of Search............................. 280/473 S

[56] References Cited
UNITED STATES PATENTS

| | | | |
|---|---|---|---|
| 3,019,257 | 1/1962 | Canonica | 260/473 S |
| 3,071,658 | 1/1963 | Price | 260/93.7 |
| 3,711,517 | 1/1973 | Siddall | 260/340.5 |

FOREIGN PATENTS OR APPLICATIONS 1,156,080   5/1964   Germany

OTHER PUBLICATIONS

Buchi et al, Arzneim Forsch. 1968 18(5) 610-616.
Herbert, Trans Faraday Soc. 63(3) 555-560 (1967).
Gray et al, J. Chem. Soc. 1954 2556-2562.
Collins et al, ibid 1966 2196.
Nodzo et al, Chem. Abst. 54 10936; (1960)
Tapszergyar, Chem. Abst. 67 32496r (1967).
Laver et al, J. Am. Chem. Soc. 67 1254 (1945)

Primary Examiner—Robert Gerstl
Attorney, Agent, or Firm—Samuel L. Welt; Jon S. Saxe; Bernard S. Leon

[57] ABSTRACT

Alkyl ethers or thioethers of benzene or benzyl derivatives wherein the alkyl radical contains a chain of six to 13 carbon atoms which are useful in killing and preventing the proliferation of insects by upsetting their hormone balance.

26 Claims, No Drawings

ALKYL OXYBENZOIC ACID ESTERS

SUMMARY OF THE INVENTION

In accordance with this invention, it has been found that compounds of the formula:

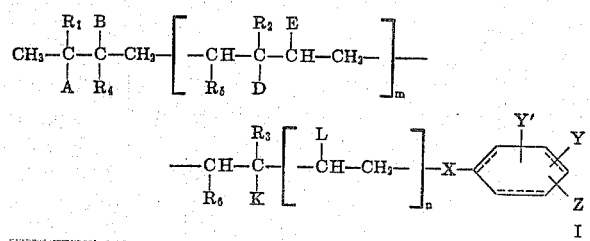

wherein $R_1$ is methyl or ethyl; $R_2$ and $R_3$ are hydrogen, methyl or ethyl; $R_4$ is hydrogen or methyl; $R_5$ and $R_6$ are hydrogen or lower alkyl; A, B, D, E, K and L are individually hydrogen or halogen; X is oxo, thio, sulfinyl, sulfonyl,

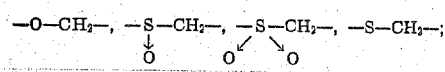

Y and Y' are individually hydrogen, halogen, lower alkyl, nitro, hydroxy or lower alkoxy; Z is lower alkoxycarbonyl, aryloxycarbonyl, aralkoxycarbonyl or lower alkylcarbonylalkyleneoxycarbonyl; m and n are integers from 0 to 1; and the dotted lines can be optionally hydrogenated; with the proviso that when n is O, K is hydrogen; upset the hormone balance of pests such as insects to prevent them from growing and reproducing.

The compounds of formula I are prepared through the condensation of a halide of the formula:

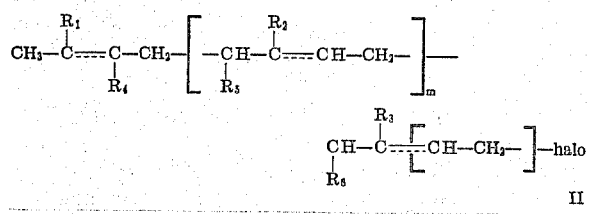

wherein m, n, $R_1$, $R_2$, $R_3$, $R_4$, $R_5$ and $R_6$ are as above; and the dotted lines can be optionally hydrogenated; with a compound of the formula:

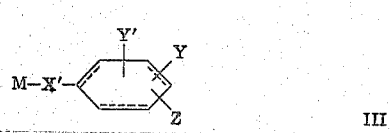

wherein M is a metal of Group I in the periodic table; X' is $-O-$, $-O-CH_2-$, $-S-$, or $-S-CH_2-$; Y, Y' and Z are as above; and the dotted lines can be optionally hydrogenated;
and, if desired, hydrogenating, halogenating or hydrohalogenating the double bonds and/or oxidizing the thioether to a sulfinyl or sulfonyl group.

DETAILED DESCRIPTION OF THE INVENTION

The term "halogen" as used throughout this application, includes all four halogens, i.e., bromine, chlorine, fluorine, and iodine. The preferred halogens are chlorine, bromine and fluorine. As used throughout this application, the term "lower alkyl" comprehends both straight and branched chain saturated hydrocarbon groups containing from one to six carbon atoms, such as methyl, ethyl, propyl, isopropyl, etc. The term "lower alkoxy" comprehends lower alkoxy groups containing from one to six carbon atoms such as methoxy, propoxy, ethoxy, etc. The term "lower alkylene" comprehends divalent saturated hydrocarbon groups containing from one to six carbon atoms such as methylene, propylene, and ethylene.

The term "aryl", as used throughout the application, includes mononuclear aryl groups such as phenyl which can be unsubstituted or substituted in 1 or more positions with a hydroxy, methylenedioxy, halogen, nitro, lower alkyl or a lower alkoxy substituent, and polynuclear aryl groups such as naphthyl, anthryl, phenanthryl, azulyl, etc., which may be substituted with 1 or more of the aforementioned groups. The preferred aryl groups are phenyl, naphthyl and tolyl. The term "aryloxycarbonyl" comprehends aryloxycarbonyl groups wherein the aryl moiety is defined as above. The preferred aryloxycarbonyl group is phenoxycarbonyl. The term "aralkyloxycarbonyl" comprehends aralkoxycarbonyl groups wherein aryl is defined as above and the alkyl is lower alkyl. The preferred aralkoxycarbonyl group is benzyloxycarbonyl. The term "alkoxycarbonyl" as utilized herein includes lower alkoxycarbonyl groups wherein lower alkoxy is defined as above. Among the preferred lower alkoxycarbonyl groups are included methoxycarbonyl, ethoxycarbonyl and isopropoxycarbonyl. The terms "oxo" and "thio" define oxygen and sulphur with two bonds ($-O-$ and $-S-$).

The term "lower alkylcarbonyl" as utilized herein includes lower alkylcarbonyl groups wherein lower alkyl is defined as above. Among the preferred lower alkylcarbonyl groups are included methylcarbonyl, ethylcarbonyl, propylcarbonyl, etc. The term "lower alkyleneoxycarbonyl" as utilized herein includes lower alkyleneoxycarbonyl groups wherein lower alkylene is defined as above. Among the preferred lower alkyleneoxycarbonyl groups are included methyleneoxycarbonyl, ethyleneoxycarbonyl, propyleneoxycarbonyl, etc. The term "lower alkylcarbonylalkyleneoxycarbonyl" includes lower alkylcarbonylloweralkyleneoxycarbonyl groups wherein "lower alkyleneoxycarbonyl" and "lower alkylcarbonyl" are defined as above. Among the preferred lower alkylcarbonylloweralkyleneoxycarbonyl groups are included, methylcarbonylmethyleneoxycarbonyl, ethylcarbonylethyleneoxycarbonyl, etc.

The compounds of formula I are useful in the control of pests such as *Tineola biselliella* (clothes moth), *Ephestia kuhniella* (meal moth), *Dysdercus cingulatus* (cotton bug), *Blatella germanica* (cockroach).

In contrast to most of the known pest-control agents which kill, disable or repell the pests by acting as contact poisons and feed poisons, the compounds of formula I above prevent maturation and proliferation of these pests by interferring with their hormonal system. In insects, for example, the formation into the imago, the laying of viable eggs and the development of laid normal eggs is disturbed. Furthermore, the sequence of generations is interrupted and the insects are indirectly killed.

The compounds of formula I above are practically non-toxic to vertebrates. The toxicity of these compounds is greater than 1000 mg/kg body weight. Moreover, these compounds are readily degraded and the risk of accumulation is therefore excluded. Therefore, these compounds can be used without fear of danger in the control of pests in animals, plants, foods and textiles.

Generally, in controlling invertebrate animals, the compounds of formula I above thereof are applied to the material to be protected, e.g., foodstuffs, feeds, textiles, plants in concentrations of from about $10^{-3}$ to $10^{-8}$ g/cm$^2$ of the material to be protected. Generally, it is preferred to utilize the compounds of formula I above in a composition with a suitable inert carrier. Any conventional inert carrier can be utilized.

The compound of formula I can, for example, be used in the form of emulsions, suspensions, dusting agents, solutions or aerosols. In special cases, the materials to be protected (e.g., foodstuffs, seeds, textiles and the like) can also be directly impregnated with the appropriate compound or with a solution thereof. Moreover, the compounds can also be used in a form which only releases them by the action of external influences (e.g., contact with moisture) or in the animal body itself.

The compound of formula I above can be used as solutions suitable for spraying on the material to be protected which can be prepared by dissolving or dispersing these compounds in a solvent such as mineral oil fractions; cold tar oils; oils of vegetable or animal origins; hydrocarbons such as naphthalenes; ketones such as methyl ethyl ketone; or chlorinated hydrocarbons such as tetrachloroethylene, tetrachlorobenzene, and the like. The compounds of formula I above can also be prepared in forms suitable for dilution with water to form aqueous liquids such as, for example, emulsion concentrates, pastes or powders. The compounds of formula I above can be combined with solid carriers for making dusting or strewing powders as, for example, talc, kaolin, bentonite, calcium carbonate, calcium phosphate, etc. The compositions containing the compound of formula I above can contain, if desired, emulsifiers, dispersing agents, wetting agents, or other active substances such as fungicides, bacteriacides, nematocides, fertilizers and the like. These materials which are to be protected act as bait for the insect. In this manner, the insect, by contacting the material impregnated with the compound of formula I above, also contacts the compound of formula I above.

It will be appreciated from the foregoing that the invention also includes within its scope an agent useful for the control of pests which contains as an essential active ingredient or essential active ingredients one or more of the phenyl derivatives of formula I in association with a compatible carrier material. In addition, the invention includes within its scope a method of rendering a locus subject to or subjected to attack by pests immune to or free from such attack, said method comprising applying to said locus an agent as hereinbefore defined or one or more of the phenyl derivatives of formula I.

Among the preferred compounds of formula I are included the following:

p-[(1,5-dimethyl-hexyl)-oxy]-benzoic acid methylester;

p-[(1,5-dimethyl-hexyl)-oxy]-hexahydro benzoic acid-methylester;

p-[(1,5-dimethyl-heptyl)-oxy]-benzoic acid methylester;

p-[(3,6,7-trimethyl-octyl)-oxy]-benzoic acid ethyl ester;

3-chlor-4-[(1,5-dimethyl-hexyl)-oxy]-benzoic acid-methylester;

p-[(5-chlor-1,5-dimethyl-hexyl)-oxy]-benzoic acid-methylester;

p-[(1,5-dimethyl-hexyl)-thio]-benzoic acid-methylester;

p-[(1,4,5-trimethyl-hexyl)-oxy]-benzoic acid-methylester;

3-nitro-4-[(1,5-dimethyl-hexyl)-oxy]-benzoic acid-methylester;

4-[(1,5-dimethyl-hexyl)-oxy]-3,5-dimethoxybenzoic acid-methylester;

p-[(1-ethyl-5-methyl-heptyl)-oxy]-benzoic acid-methylester;

p-[(3,7-dimethyl-octyl)-oxy]-benzoic acid-methylester;

3,5-dichloro-4-[(1,5-dimethyl-hexyl)-oxy]-benzoic acid-ethylester;

5-bromo-4-[(1,5-dimethyl-hexyl)-oxy]-m-anisic acid-methylester;

p-[(1,5-dimethyl-hexyl)-oxy]-benzoic acid acetonylester;

p-[(3-ethyl-7-methyl-nonyl)-oxy]-benzoic acid-methylester;

p-[(2,3,6,7-tetrachloro-3-ethyl-7-methyl-nonyl)-oxyl]-benzoic acid-methylester;

5-bromo-4-[(1,5-dimethyl-hexyl)-oxy]-salicylic acid-methylester;

p-[(2,3,6,7-tetrabromo-3,7-dimethyl-octyl)-oxy]-benzoic acid-methylester;

p-[(1,5,9-trimethyl-undecyl)-oxy]-benzoic acid-methylester; and p-[(3,7,11-trimethyl-dodecyl)-oxy]-benzoic acid-methylester.

Among the preferred phenyl derivatives which are included within formula I are the following:

a. derivatives of the general formula:

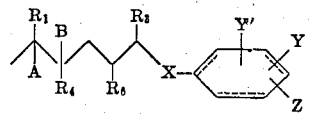

Ia wherein $R_1$, $R_3$, $R_4$, $R_6$, A, X, Y', Y and Z are as above; and the dotted bonds can by hydrogenated;

b derivatives of the general formula:

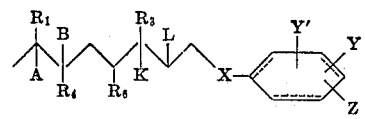

Ib wherein $R_1$, $R_3$, $R_4$, $R_6$, A, B, K, L, X, Y, Y', and Z are as above; and the dotted bonds can be hydrogenated;

c. derivatives of the general formula:

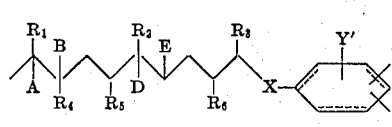

Ic wherein $R_1$, $R_2$, $R_3$, $R_4$, $R_5$, $R_6$, A, B, D, E, X, Y, Y' and Z are as above; and the dotted bonds can be hydrogenated; and d. derivatives of the general formula:

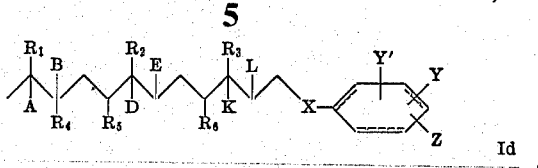

Wherein $R_1$, $R_2$, $R_3$, $R_4$, $R_5$, $R_6$, A, B, X, D, E, K, L, Y, Y' and Z are as above; and the dotted bonds can be hydrogenated.

Among the preferred starting materials of formula II are the following:

a. halides of the general formula:

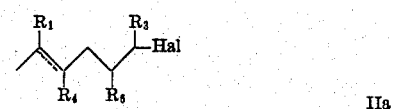

wherein $R_1$, $R_3$, $R_4$, and $R_6$ are as above; Hal is a halogen; and the dotted bond can be optionally hydrogenated;

b. halides of the general formula:

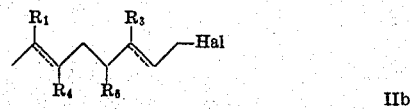

wherein $R_1$, $R_3$, $R_4$, $R_6$, A' and Hal are as above; and the dotted bonds can be optionally hydrogenated;

c. halides of the general formula:

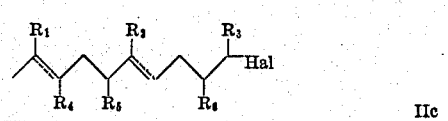

wherein $R_1$, $R_2$, $R_3$, $R_4$, $R_5$ and $R_6$ are as above; Hal is a halogen; and the dotted bonds can be optionally hydrogenated;

d. halides of the general formula:

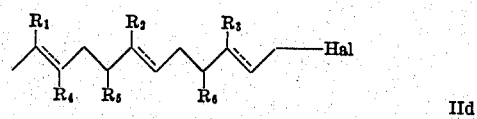

wherein $R_1$, $R_2$, $R_3$, $R_4$, $R_5$, $R_6$ and Hal are as above; and the dotted lines can be optionally hydrogenated.

Especially preferred classes of phenyl derivatives of the formula I are the following:

e. derivatives of the general formula:

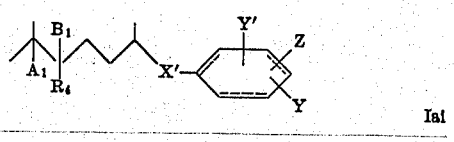

wherein $A_1$ and $B_1$ each signify hydrogen or chlorine, $R_4$, X', Y, Y' and Z are as above and the dotted bonds can be optionally hydrogenated;

f. derivatives of the general formula:

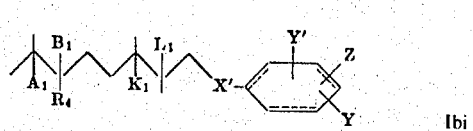

wherein $A_1$, $B_1$, $R_4$, X', Y, Y' and Z have the significance given earlier and $K_1$ and $L_1$ each signify hydrogen or halogen;

g. derivatives of the general formula:

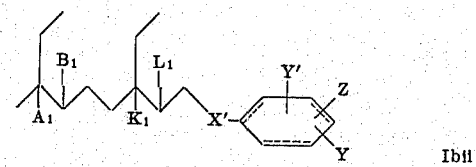

wherein $A_1$, $B_1$, $K_1$, $L_1$, X', Y, Y' and Z are as above;

h. derivatives of the general formula:

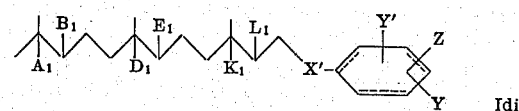

wherein $A_1$, $B_1$, $K_1$, $L_1$, X', Y, Y' and Z are as above and $D_1$ and $E_1$ are hydrogen or halogen.

In accordance with an embodiment of this invention, in the compounds of formulas Iai, Ibi, Ibii and Idi, Y and Y' are hydrogen, X' is oxygen, Z is lower alkoxycarbonyl and the dotted bonds can represent unsaturated bonds. In accordance with another embodiment of this invention, in the compounds of formulas Iai, Ibi, Ibii and Idi, Y and Y' are hydrogen, X' is —S—, Z is lower alkoxycarbonyl and the dotted bonds can represent unsaturated bonds. In another embodiment of this invention, in the compounds of formulas Iai, Ibi, Ibii and Idi, X' is oxygen, Y and Y' are hydrogen, Z is lower alkoxycarbonyl and the dotted bonds are hydrogenated. In accordance with another embodiment, in the compounds of formulas Iai, Ibi, Ibii and Idi, X is oxygen or thio, Y and Y' are hydrogen, Z is phenyl-lower alkoxycarbonyl and the dotted bonds are unsaturated. In accordance with another embodiment of this invention, in the compounds of formulas Iai, Ibi, Ibii and Idi, X' is oxygen, Y' is hydrogen, Y is lower alkyl or lower alkoxy, Z is lower alkoxycarbonyl and the dotted bonds are unsaturated. In accordance with another embodiment, in the compounds of formulas Iai, Ibi, Ibii and Idi, Y' is hydrogen, Y is halogen or nitro, Z is lower alkoxycarbonyl and X' is oxygen. In accordance with another embodiment of this invention, in the compounds of formulas Iai, Ibi, Ibii and Idi, Y is lower alkoxy or hydroxy, Y' is hydrogen, lower alkoxy or halogen, Z is lower alkoxycarbonyl and the dotted bonds are unsaturated. In accordance with still another embodiment of this invention, in the compounds of formulas Iai, Ibi, Ibii and Idi, Y and Y' are hydrogen, Z is lower alkylcarbonylalkyleneoxycarbonyl and the dotted bonds are hydrogenated.

Especially preferred halides of the formula II for use in this invention are the following:

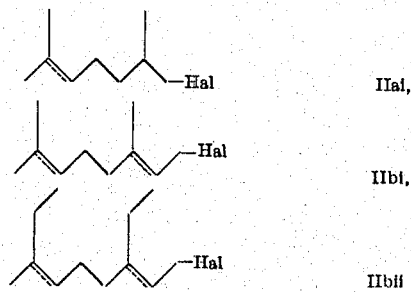

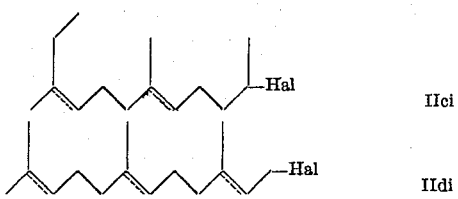

wherein Hal has the significance given earlier and the dotted bonds can be hydrogenated.

The halide starting materials of formula II and the starting materials of formula III are known substances and they can be reacted with each other to produce a compound of the formula I above in accordance with methods known per se.

For example, a halide of formula II preferably a chloride or bromide is expediently dissolved in an inert organic solvent and the solution allowed to act on a compound of formula III (formed in statu nascendi). The compound of formula III (an alkali metal salt) can advantageously be formed by reacting the corresponding phenol, alcohol, thiophenol or thioalcohol with an alkali metal hydride, alkali metal alcoholate or alkali metal hydroxide, preferably sodium hydride, a sodium alcoholate or sodium hydroxide in a known manner. The salt formation and the reaction of the salt with the halide are expediently carried out in the presence of a suitable inert organic solvent. When sodium hydride is used, suitable solvents are, for example, dioxane, tetrahydrofuran, dimethylformamide or ethyl ether, when sodium methylate is used a suitable solvent is, for example, methanol or when sodium hydroxide is used suitable solvents are, for example, methanol, ethanol or acetone. The reaction of the halide with a phenol, alcohol, thiophenol or thioalcohol can also be carried out in the presence of a carbonate, preferably potassium carbonate.

The reaction of a halide of formula II with a compound of formula III is expediently carried out at a temperature between 0°C. and the boiling temperature of the reaction mixture, advantageously in the presence of hexamethyl phosphoric acid triamide. The reaction mixture can be worked up in a conventional manner. For example, it can be poured onto ice and extracted with diethyl ether, the ether extract washed with water, dried and evaporated. The resulting derivative of formula I can be purified by adsorption; for example, on Kieselgel or aliminum oxide.

If desired, the double bonds in the condensation product formed by reacting the compounds of formula II with the compounds of formula III can be hydrogenated, halogenated or hydrohalogenated in accordance with methods known per se.

The hydrogenation of unsaturated derivatives of formula I can be carried out at normal or elevated pressure with catalytically activated hydrogen, expediently at a temperature between room temperature and the boiling temperature of the solvent used. Suitable catalysts are, for example, Raney nickel or, especially, noble metals such as, for example, palladium or platinum. Suitable solvents include ethyl acetate, alkanols such as methanol and ethanol and glacial acetic acid. If the hydrogenation is carried out in ethyl acetate or in an alkanol (e.g., methanol) under the conditions described hereinabove, the side chain is almost exclusively saturated. If, on the other hand, the hydrogenation is carried out in the presence of glacial acetic acid, not only the side chain but also the phenyl ring is saturated. The corresponding cyclohexyl derivatives are thus obtained and they can be separated by distillation from cleavage products of the hydrogen atom which may also be formed. It should be noted, that only sulphur free compounds can advantageously be subjected to this type of hydrogenation.

The hydrohalogenation of a derivative of formula I is expediently carried out by dissolving the derivative concerned in an inert organic solvent (e.g., an ether, especially ethyl ether, or an alkanol, especially methanol or ethanol), saturating the solution obtained with a hydrogen halide either at a low temperature (e.g., a temperature between −20°C. and −25°C.) or at a temperature between 0°C. and room temperature and working up the reaction solution in a conventional manner; for example, by carefully evaporating the solution under pressure, dissolving the concentrate in diethyl ether, deacidifying, drying and evaporating the extract. If the hydrohalogenation is carried out within the aforementioned low temperature range, the derivative used is almost exclusively monohydrohalogenated at the terminal unsaturation. On the other hand, if the hydrohalogenation is carried out at temperatures around and above 0°C., the elements of hydrogen halide are added to all double bonds present. Derivatives having an allylic ether group are less suitable for the hydrohalogenation described hereinbefore, since the ether is, in part, cleaved under the hydrohalogenation conditions specified earlier.

The halogenation of the unsaturated double bonds can be carried out by conventional procedures. In accordance with a preferred embodiment, this halogenation is carried out by treating the compound containing the unsaturated double bond with a halogen. This treatment is carried out in an inert organic solvent, preferably a lower aliphatic carboxylic acid, which can be ice cold or a chlorinated hydrocarbon such as carbon tetrachloride. The halogen is added to the reaction medium dissolved in the same solvent as the unsaturated compound to be halogenated. The reaction is carried out in the presence of a base such as an alkali metal acetate, preferably sodium acetate. Temperatures of from 0°C. to 60°C. are generally utilized in this reaction. Room temperature is generally preferred. The reaction mixture can be worked up by conventional procedures. For example, the reaction product can be extracted with diethyl ether. The ether extract can be washed, evaporated and dried. The resulting product can be purified by crystallization or by adsorption on Kieselgel (silica gel).

Thioethers obtained can be oxidized to the corresponding sulfinyl or sulfonyl derivatives by oxidation. Particularly suitable oxidizing agents are organic peracids, preferably m-chloroperbenzoic acid. The oxidation is advantageously carried out in an inert organic solvent, especially in methylene chloride, at a temperature between 0°C. and room temperature. If 1 mole of peracid is used for each mole of thioether, the corresponding sulfinyl derivative is obtained. If 2 moles of peracid are used for each mole of thioether, the corresponding sulfonyl derivative is obtained.

Insofar as the side chain is unsaturated, the derivatives of formula I are obtained according to the process as a cis/trans isomer mixture. The mixture can, for example, be separated into the individual isomeric forms by adsorption on a material having selective activity.

For example, the isomer mixture can be dissolved in an inert organic solvent (e.g., in hexane, ether or acetic acid ethyl ether) and adsorbed on Kieselgel. The isomers adsorbed in different zones can be eluted with one of the solvents named hereinbefore or a mixture thereof and isolated. In individual cases, the isomer mixture can also be separated by fractional distillation or by fractional crystallization.

The following examples are illustrative but not limitative of this invention.

EXAMPLE 1

In an inert gas atmosphere, 13.7 G. of a 50 percent by weight suspension of sodium hydride in mineral oil are washed with two 70 ml. portions of tetrahydrofuran, then introduced into 100 ml. of tetrahydrofuran and treated dropwise with a solution of 40 g. of p-hydroxy-benzoic acid methyl ester in 250 ml. of tetrahydrofuran. 50 G. of 2-bromo-6-methyl-hept-5-ene in 80 ml. of hexamethylphosphoric triamide are subsequently added dropwise, then the resulting mixture is heated under reflux conditions for 12 hours, cooled, poured onto ice and exhaustively extracted with diethyl ether. The ether extract is washed with water, dried over sodium sulfate and evaporated under reduced pressure. The residual oily p-[(1,5-dimethyl-hex-4-enyl)-oxy]-benzoic acid methyl ester is purified by adsorption on Kieselgel; boiling point = 158°–160°C./0.1 mmHg.

EXAMPLE 2

2 G. of p-[(1,5-dimethyl-hex-4-enyl)-oxy]-benzoic acid methyl ester are dissolved in 20 ml. of methanol and hydrogenated under normal conditions in the presence of 0.1 g. of platinum oxide. After the uptake of 1 mol of hydrogen, the hydrogenation is terminated and the catalyst is filtered off. The clear filtrate is evaporated under reduced pressure. The residual oily p-[(1,5-dimethyl-hexyl)-oxy]-benzoic acid methyl ester is purified by adsorption on Kieselgel; boiling point = 132°–133°C./0.1 mmHg; $n_D^{24}$ = 1.4883.

EXAMPLE 3

1 G. of p-[(1,5-dimethyl-hex-4-enyl)-oxy]-benzoic acid methyl ester is added dropwise at room temperature to 10 ml. of methanol saturated with hydrogen chloride gas. After 15 minutes, the resulting solution is poured onto ice and exhaustively extracted with petroleum ether. The petroleum ether extract is washed neutral, dried over sodium sulfate and evaporated under reduced pressure. The residual p-[(5-chloro-1,5-dimethyl-hexyl)- oxy]-benzoic acid methyl ester is purified by adsorption on Kieselgel; $n_D^{24}$ = 1.4881.

EXAMPLE 4

2.5 G. of racemic p-[(1,5-methyl-hexyl)-oxy]-benzoic acid methyl ester are dissolved in 25 ml. of methanol, treated with 10 ml. of aqueous 2N sodium hydroxide solution, heated under reflux for 1 hour, cooled, acidified with aqueous 2N hydrochloric acid and exhaustively extracted with diethyl ether. The ether extract is dried over sodium sulfate and evaporated under reduced pressure. The residual racemic p-[(1,5-dimethyl-hexyl)-oxy]-benzoic acid can be purified by crystallization from benzene; melting point = 55°C.

EXAMPLE 5

8.6 G. of racemic p-[(1,5-dimethyl-hexyl)-oxy]-benzoic acid and 4.8 g. of optically active (+)-dehydroabietylamine are introduced into 60 ml. of absolute methanol, treated with a solution of 0.7 g. of sodium hydroxide in 20 ml. of water and heated until a clear solution is obtained. The solution is allowed to stand for 22 hours, then the precipitated crystals are filtered off and recrystallized from 20 percent methanol until the melting point is constant. The optically active salt melts at 125°–126°C.; $[\alpha]_D^{20}$ = +2.65° ($c$ = 1.68 percent in methanol).

210 Mg. of the foregoing optically active salt are treated with 10 ml. of 2N sodium hydroxide solution and the resulting mixture is extracted with hexane. While cooling with ice, the aqueous phase is made acidic to Congo red with 2N hydrochloric acid and extracted with diethyl ether. The ether extract is washed with water, dried over sodium sulfate and evaporated under reduced pressure. The residual optically active p-[(1,5-dimethyl-hexyl)-oxy]-benzoic acid can be purified by crystallization from benzene and melts at 69°–70°C.; $[\alpha]_D^{20}$ = +0.84° ($c$ = 2.59 percent in chloroform).

A solution of 95 mg. of the foregoing optically active p-[(1,5-dimethyl-hexyl)-oxy]-benzoic acid and 150 mg. of N,N-dimethylformamide dimethoxy acetal in 20 ml. of absolute benzene is heated under reflux for 2 hours, cooled, successively washed with water, 0.2N hydrochloric acid, 0.2N sodium hydroxide solution and water, dried over sodium sulfate and evaporated under reduced pressure. The residue is optically active p-[(1,5-dimethyl-hexyl)- oxy]-benzoic acid methyl ester; $[\alpha]_D^{20}$ = +7.0° ($c$ = 0.104 percent in methanol).

EXAMPLE 6

In the manner described in Example 1, 2-bromo-5,6-dimethyl- hept-5-ene and p-hydroxy-benzoic acid methyl ester are reacted to produce p-[(1,4,5-trimethyl-hex-4-enyl)-oxy]-benzoic acid methyl ester (boiling point = 160°–165°C./0.1 mmHg).

EXAMPLE 7

In the manner described in Example 2, p-[(1,4,5-trimethyl- hex-4-enyl)-oxy]-benzoic acid methyl ester is converted to p-[(1,4,5-trimethyl-hexyl)-oxy]-benzoic acid methyl ester ($n_D^{24}$ = 1.4938).

EXAMPLE 8

In the manner described in Example 1:

2-bromo-6-methyl-heptane and p-hydroxy-benzoic acid ethyl ester are reacted to produce p-[(1,5-dimethyl-hexyl)-oxy]-benzoic acid ethyl ester (boiling point = 160°–162°C./0.1 mmHg);

2-bromo-6-methyl-heptane and p-hydroxy-benzoic acid propyl ester are reacted to produce p-[(1,5-dimethyl-hexyl)-oxy]-benzoic acid propyl ester (boiling point = 180°–182°C./0.1 mmHg);

2-bromo-6-methyl-heptane and p-hydroxy-benzoic acid benzyl ester are reacted to produce p-[(1,5-dimethyl-hexyl)-oxy]-benzoic acid benzyl ester (boiling point = 210°–212°C./0.1 mmHg);

2-bromo-6-methyl-heptane and 3-methyl-4-hydroxy-benzoic acid methyl ester are reacted to produce 3-methyl-4-[(1,5-dimethyl- hexyl)-oxy]-benzoic acid methyl ester (boiling point = 200°–205°C./0.1 mmHg);

2-bromo-6methyl-heptane and vanillic acid methyl ester are reacted to produce 4-[(1,5-dimethyl-hexyl)-oxy]-3-methoxy- benzoic acid methyl ester (boiling point = 198°–200°C./0.1mmHg);

2-bromo-6-methyl-heptane and 2-methyl-4-hydroxy-benzoic acid methyl ester are reacted to produce 2-methyl-4-[(1,5-dimethyl-hexyl)-oxy]-benzoic acid methyl ester (boiling point = 205°C./1.0mmHg);

2-bromo-6-methyl-heptane and 3-nitro-4-hydroxy-benzoic acid methyl ester are reacted to produce 3-nitro-4-[(1,5-dimethyl- hexyl)-oxy]-benzoic acid methyl ester (boiling point = 180°–182°C./0.1 mmHg);

2-bromo-6-methyl-heptane and 5-bromo-m-anisic acid methyl ester are reacted to produce 5-bromo-4-[(1,5-dimethyl-hexyl)- oxy]-m-anisic acid methyl ester (boiling point = 180°–183°C. /0.5 mmHg);

2-bromo-6-methyl-heptane and 4-hydroxy-3,5-dimethoxy-benzoic acid methyl ester are reacted to produce 4-[(1,5-dimethyl-hexyl)- oxy]-3,5-dimethoxy-benzoic acid methyl ester (boiling point = 140°–09°C./0.1mmHg);

2-bromo-6-methyl-heptane and 2,4-dihydroxy-5-bromo-benzoic aic methyl ester are reacted to produce 5-bromo-4-[(1,5-dimethyl- hexyl)-oxy]-salicylic acid methyl ester (boiling point = 160°–162°C./0.03 mmHg); and 2-bromo-6-methyl-heptane and 3-chloro-4-hydroxy-benzoic acid methyl ester are reacted to produce 3-chloro-4-[(1,5-dimethyl-hexyl)-oxy]-benzoic acid methyl ester (boiling point = 128°–130°C./0.04 mmHg; $n_D^{25} = 1.5083$).

EXAMPLE 9

In the manner described in Example 1, p-[(1,5-dimethyl- hexyl)-oxy]-benzoic acid and bromo-acetone are reacted to produce p-[(1,5-dimethyl-hexyl)-oxy]-benzoic acid acetonyl ester (boiling point = 151°–152°C./0.1 mmHg).

EXAMPLE 10

In an inert gas atmosphere, 4.8 g. of a 50 percent by weight suspension of sodium hydride in mineral oil are washed with two 25 ml. portions of tetrahydrofuran, then introduced into 50 ml. of tetrahydrofuran and treated dropwise with a solution of 14 g. of p-hydroxy-benzoic acid methyl ester in 100 ml. of tetrahydrofuran. 22 G. of 1-bromo-3,7-dimethyl-octa-2,6-diene in 40 ml. of hexamethylphosphoric triamide are subsequently added dropwise and the resulting mixture is heated under reflux conditions for 2 hours, cooled, poured onto ice and exhaustively extracted with diethyl ether. The ether extract is washed with water, dried over sodium sulfate and evaporated under reduced pressure. The residual oily p-[(3,7-dimethyl-octa-2,6-dienyl)- oxy]-benzoic acid methyl ester is purified by adsorption on Kieselgel; boiling point = melting point 38°–39°C.

EXAMPLE 11

1 G. of p-[(3,7-dimethyl-octa-2,6-dienyl)-oxy]-benzoic acid methyl ester is dissolved in 20 ml. of methanol and hydrogenated under normal conditions in the presence of 0.1 g. of platinum oxide. After the uptake of 2 mol of hydrogen, the hydrogenation is terminated and the catalyst is filtered off. The clear filtrate is evaporated under reduced pressure. The residual oily p-[(3,7-dimethyl-octyl)-oxy]-benzoic acid methyl ester is purified by adsorption on Kieselgel; $n_D^{24} = 1.4777$.

EXAMPLE 12

3.5 G. of p-[(3,7-dimethyl-octa-2,6-dienyl)-oxy]-benzoic acid methyl ester are dissolved in 20 ml. of glacial acetic acid, treated with a solution of 3.2 g. of bromine in 32 ml. of glacial acetic acid and allowed to stand at room temperature for 12 hours in the presence of 3 g. of sodium acetate. The resulting mixture is treated with 100 ml. of water and exhaustively extracted with diethyl ether. The ether extract is washed with water and with sodium bicarbonate solution, dried over sodium sulfate and evaporated under reduced pressure. The residual p-[(2,3,6,7-tetrabromo-3,7-dimethyl-octyl)-oxy]-benzoic acid methyl ester melts at 129°–130°C.

EXAMPLE 13

In the manner described in Example 10 p-hydroxy-benzoic acid methyl ester and 1-bromo-3-ethyl-7-methyl-nona-2,6-diene are reacted to produce p-[(3-ethyl-7-methyl-nona-2,6-dienyl)-oxy]-benzoic acid methyl ester ($n_D^{24} = 1.5229$). This product is hydrogenated to p-[(3-ethyl-7-methyl-nonyl)-oxy]-benzoic acid methyl ester ($n_D^{24} = 1,4852$) in the manner described in Example 2.

EXAMPLE 14

In the manner described in Example 10, p-hydroxy-benzoic acid ethyl ester and 1-chloro-3,6,7-trimethyl-octa-2,6-diene are reacted to produce p-[(3,6,7-trimethyl-octa-2,6-dienyl)-oxy]-benzoic acid ethyl ester (boiling point = 150°–151°C./0.02 mmHg; $n_D^{25} = 1.5241$).

EXAMPLE 15

In the manner described in Example 11, p-[(3,6,7-trimethyl- octa-2,6-dienyl)-oxy]-benzoic acid ethyl ester is converted to p-[(3,6,7-trimethyl-octyl)-oxy]-benzoic acid ethyl ester (boiling point = 155°–156°C./0.02 mmHg).

EXAMPLE 16

In the manner described in Example 10, m-hydroxy-benzoic acid ethyl ester and 1-bromo-3,7-dimethyl-octa-2,6-diene are reacted to produce m-[(3,7-dimethyl-octa-2,6-dienyl)-oxy]-benzoic acid ethyl ester ($n_D^{25} = 1.5156$).

EXAMPLE 17

As described in Example 11, m-[(3,7-dimethyl-octa-2,6-dienyl)-oxy]-benzoic acid ethyl ester is converted to m-[(3,7-dimethyl-octyl)-oxy]-benzoic acid ethyl ester (boiling point = 142°– °C./0.05 mmHg).

EXAMPLE 18

In an inert gas atmosphere, 4.14 g. of a 50 percent by weight suspension of sodium hydride in mineral oil are washed with two 70 ml. portions of tetrahydrofuran, then introduced into 100 ml. of tetrahydrofuran and treated dropwise with a solution of 16 g. of p-mercapto-benzoic acid methyl ester in 200 ml. of tetrahydrofuran. 25 G. of 2-bromo-6-methyl-heptane in 86 ml. of hexamethylphosphoric triamide are subsequently added dropwise and the resulting mixture is heated under reflux conditions for 2 hours, cooled, poured onto ice and exhaustively extracted with diethyl ether. The ether extract is washed with water, dried over sodium sulfate and evaporated under reduced pressure. The residual p-[(1,5-dimethyl-hexyl)-thio]-benzoic acid methyl ester is purified by adsorption on Kieselgel; boiling point = 168°–170°C./0.5 mmHg.

EXAMPLE 19

In an inert gas atmosphere, 15 g. of a 50 percent by weight suspension of sodium hydride in mineral oil are washed with two 50 ml. portions of tetrahydrofuran, then introduced into 150 ml. of tetrahydrofuran and treated dropwise with a solution of 48 g. of p-hydroxybenzoic acid methyl ester in 200 ml. of tetrahydrofuran. 81 G. of 2-bromo-6,10-dimethyl-dodeca-5,9-diene in 120ml. of hexamethylphosphoric triamide are subsequently added dropwise over a period of 30 minutes and the resulting mixture is subsequently stirred under reflux conditions for 6 hours, then stirred at room temperature for 20 hours, poured onto ice and exhaustively extracted with ether. The extract is dried over sodium sulfate and evaporated. The residual p-[(1,5,9-trimethyl-undeca-4,8-dienyl)-oxy]-benzoic acid methyl ester is purified by adsorption on Kieselgel; boiling point =230°–233°C./0.1 mmHg.

p-[(1,5,9-Trimethyl-undeca-4,8-dienyl)-oxy]-benzoic acid methyl ester is hydrogenated to p-[(1,5,9-trimethyl-undecyl)- oxy]-benzoic acid methyl ester ($n_D^{24} = 1.4958$) in the manner described in Example 2.

EXAMPLE 20

In an inert gas atmosphere, 4.8 g. of a 50 percent by weight suspension of sodium hydride in mineral oil are washed with two 25 ml. portions of tetrahydrofuran, then introduced into 50 ml. of tetrahydrofuran and treated dropwise with a solution of 14.9 g. of p-hydroxybenzoic acid methyl ester in 100 ml. of tetrahydrofuran. 28.6 G. of 1-bromo-3,7,11-trimethyl-dodeca-2,6,10-triene in 40 ml. of hexamethylphosphoric triamide are subsequently added dropwise and the resulting mixture is subsequently heated under reflux conditions for 2 hours, cooled, poured onto ice and exhaustively extracted with diethyl ether. The ether extract is washed with water, dried over sodium sulfate and evaporated under reduced pressure. The residual p-[(3,7,11-trimethyl-dodeca-2,6,10-trienyl)-oxy]-benzoic acid methyl ester is purified by adsorption on Kieselgel; $n_D^{24} = 1.5269$.

EXAMPLE 21

2 G. of p-[(3,7,11-trimethyl-dodeca-2,6,10-trienyl)-oxy]-benzoic acid methyl ester are dissolved in 20 ml. of methanol and hydrogenated under normal conditions in the presence of 100 mg. of platinum oxide. After the uptake of 3 mol of hydrogen, the hydrogenation is terminated and the catalyst is filtered off. The clear filtrate is evaporated under reduced pressure. The residual p-[(3,7,11-trimethyl-dodecyl)-oxy]-benzoic acid methyl ester is purified by adsorption on Kieselgel; $n_D^{24} = 1.4958$.

EXAMPLES 22–25

In Examples 22 to 25 hereinafter, which relate to tests demonstrating the activity of the phenyl derivatives provided by the invention, the various phenyl derivatives are referred to by way of the letters indicated in the following list:

A. p-[(1,5-dimethyl-hexyl)-oxy]-benzoic acid methyl ester
B. p-[(5-chloro-1,5-dimethyl-hexyl)-oxy]-benzoic acid methyl ester
C. p-[(3,7-dimethyl-octyl)-oxy]-benzoic acid methyl ester
D. p-[(1,4,5-trimethyl-hexyl)-oxy]-benzoic acid methyl ester.

EXAMPLE 22

Two filter-paper discs (24 cm²) are sprayed with a solution of active substance in acetone. After drying, they are so fixed together that a tunnel is formed to shelter larvae of the cockroach (*Blatella germanica*) in the final larval stage. The same is done with an untreated filter-paper disc and a filter-paper disc treated only with acetone. The larvae remain in continuous contact with the filter-paper and are provided with water and food. The further development of the larvae is noted daily and the results are evaluated (100 percent disturbance of metamorphosis: a normal adult develops from none of the larvae).

Results

| Active Substance | Amount of active substance (g/cm²) | No. of larvae | No. of normal imagos | Activity (%) |
|---|---|---|---|---|
| C | $10^{-4}$ | 10 | 2 | 80 |
| Control with acetone | — | 10 | 0 | 0 |
| Control without acetone | — | 10 | 0 | 0 |

EXAMPLE 23

A cotton disc (10 cm²) is sprayed with a solution of active substance in acetone. After drying, 30–60 freshly laid eggs of the meal moth (*Ephestia kuhniella*) are placed on the disc. The same is done with an untreated cotton disc and a cotton disc sprayed only with acetone. The discs are placed in a cage and kept at 25°C. and 90 percent relative humidity. The development of the eggs is registered over a period of a few days and the results are evaluated (100 percent egg mortality: no development of the embryos in the eggs laid on discs soaked with active substance).

Results

| Active Substance | Amount of active substance (g/cm²) | No. of eggs | No. of larvae | Mortality (%) |
|---|---|---|---|---|
| A | $10^{-4}$ | 84 | 0 | 100 |
|   | $10^{-5}$ | 68 | 49 | 14 |
| B | $10^{-4}$ | 28 | 0 | 100 |
|   | $10^{-5}$ | 21 | 0 | 100 |
| C | $10^{-4}$ | 34 | 2 | 94 |
|   | $10^{-5}$ | 33 | 2 | 79 |
| D | $10^{-4}$ | 52 | 0 | 100 |
|   | $10^{-5}$ | 43 | 18 | 51 |
| Control with acetone | — | 50 | 50 | 0 |
| Control without acetone | — | 49 | 46 | 6 |

EXAMPLE 24

A disc of woolen material (10 cm²) is sprayed with a solution of active substance in acetone and, together with an untreated disc and a disc treated only with acetone, hung in a cage occupied by 20 young clothes moths (*Tineola biselliella*). The development of eggs laid at 25°C. is noted over a period of 4 days and the results are evaluated (100 percent sterilant activity: larvae hatch from none of the eggs laid on treated and untreated discs of woolen material; 100 percent ovicidal activity: larvae hatch from none of the eggs laid on treated discs of woolen material).

Results

| Active Substance | Amount of active substance (g/cm²) | Sterilant activity (%) | Ovicidal activity (%) |
|---|---|---|---|
| A | $10^{-3}$ | 66 | 88 |
|   | $10^{-4}$ | 21 | 41 |
| Control with acetone | — | 0 | 0 |
| Control without acetone | — | 0 | 0 |

EXAMPLE 25

A filter-paper strip (90 cm²) is sprayed with a solution of active substance in acetone. After drying, 3-4 pairs of freshly moulted imagos of the cotton bug (*Dysdercus cingulatus*) are placed on the strip. The same is done with an untreated filter-paper strip and a filter-paper strip treated only with acetone. The development of the eggs laid daily is noted and the results are evaluated (100 percent egg mortality: no development of the embryos in the eggs laid on filter-paper strips soaked with active substance).

Results

| Active Substance | Amount of active substance (g/cm²) | No. of eggs | No. of larvae | Egg mortality (%) |
|---|---|---|---|---|
| A | $10^{-5}$ | 340 | 0 | 100 |
|   | $10^{-6}$ | 320 | 0 | 100 |
|   | $10^{-8}$ | 430 | 295 | 31 |
| B | $10^{-5}$ | 300 | 0 | 100 |
| D | $10^{-5}$ | 300 | 0 | 100 |
| Control with acetone | — | 270 | 262 | 3 |
| Control without acetone | — | 410 | 390 | 5 |

We claim:
1. A compound of the formula:

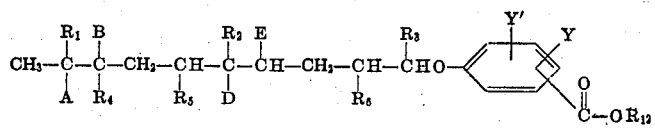

wherein $R_1$ is methyl or ethyl; $R_2$ and $R_3$ is hydrogen, methyl or ethyl; $R_4$ is hydrogen or methyl; $R_5$ and $R_6$ are hydrogen or lower alkyl; A, B, D, and E are individually hydrogen or halogen, Y and Y' are hydrogen, halogen, lower alkyl, nitro, hydroxy or lower alkoxy; and $R_{12}$ is lower alkyl.

2. The compound of claim 1 wherein said compound is p-[(1,5,9-trimethyl-undecyl)-oxy]-benzoic acid methyl ester.

3. A compound of the formula:

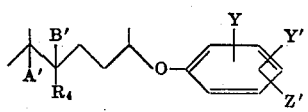

wherein A' and B' are hydrogen or halogen; $R_4$ is hydrogen or methyl; Y and Y' are hydrogen, halogen, lower alkyl, nitro, hydroxy or lower alkoxy; and Z' is lower alkoxycarbonyl.

4. The compound of claim 3 wherein Y and Y' are hydrogen.

5. The compound of claim 4 wherein said compound is p-[(1,5-dimethyl-hexyl)-oxy]-benzoic acid methyl ester.

6. The compound of claim 4 wherein said compound is p-[(5-chloro-1,5-dimethyl-hexyl)-oxy]-benzoic acid methyl ester.

7. The compound of claim 4 wherein said compound is p-[(1,5-dimethyl-hexyl)-oxy]-benzoic acid ethyl ester.

8. The compound of claim 4 wherein said compound is p-[(1,5-dimethyl-hexyl)-oxy]-benzoic acid propyl ester.

9. The compound of claim 4 wherein said compound is p-[(1,4,5-trimethyl-hexyl)-oxy]-benzoic acid methyl ester.

10. The compound of claim 3 wherein Y' is hydrogen and Y is lower alkyl or lower alkoxy.

11. The compound of claim 10 wherein said compound is 4-[(1,5-dimethyl-hexyl)-oxy]-3-methoxy-benzoic acid methyl ester.

12. The compound of claim 10 wherein said compound is 2-methyl-4-[(1,5-dimethyl-hexyl)-oxy]-benzoic acid methyl ester.

13. The compound of claim 10 wherein said compound is 3-methyl-4-[(1,5-dimethyl-hexyl)-oxy]-benzoic acid methyl ester.

14. The compound of claim 3 wherein Y' is hydrogen and Y is halogen or nitro.

15. The compound of claim 14 wherein said compound is 3-chloro-4-[(1,5-dimethyl-hexyl)-oxy]-benzoic acid methyl ester.

16. The compound of claim 14 wherein said compound is 3-nitro-4-[(1,5-dimethyl-hexyl)-oxy]-benzoic acid methyl ester.

17. The compound of claim 3 wherein Y is lower alkoxy or hydroxy, and Y' is hydrogen or halogen.

18. The compound of claim 17 wherein said compound is 5-bromo-4-[(1,5-dimethyl-hexyl)-oxy]-salicylic acid methyl ester.

19. The compound of claim 17 wherein said compound is 5-bromo-4-[(1,5-dimethyl-hexyl)-oxy]-m-anisic acid methyl ester.

20. The compound of claim 3 wherein Y and Y' are lower alkoxy.

21. The compound of claim 20 wherein said compound is 4-[(1,5-dimethyl-hexyl)-oxy]-3,5-dimethoxy-benzoic acid methyl ester.

22. The compound p-[(3,7-dimethyl-octyl)-oxy]-benzoic acid methyl ester.

23. The compound p-[(2,3,6,7-tetrabromo-3,7-dimethyl-octyl)-oxy]-benzoic acid methyl ester.

24. The compound p-[(3-ethyl-7-methyl-nonyl)-oxy]-benzoic acid methyl ester.

25. The compound of the formula

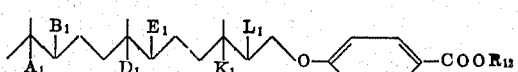
wherein $A_1$, $B_1$, $K_1$, $D_1$ and $E_1$ are hydrogen or halogen and $R_{12}$ is lower alkyl.
26. The compound of claim 25 wherein said compound is p-[(3,7,11-trimethyl-dodecyl)-oxy]-benzoic acid methyl ester.
* * * * *

UNITED STATES PATENT AND TRADEMARK OFFICE
CERTIFICATE OF CORRECTION

PATENT NO. : 3,821,284
DATED      : June 28, 1974
INVENTOR(S) : MADHUKAR SUBRAYA CHODNEKAR ET AL.

It is certified that error appears in the above-identified patent and that said Letters Patent are hereby corrected as shown below:

Cover Sheet
"[30] Foreign Application Priority Data"
April 30, 1964   should be

April 30, 1969

Cover Sheet
"[56] References Cited"
"3,071,658  1/1963 Price" should be 3,071,568  1/1963 Price Signed and Sealed this Second Day of November 1976

[SEAL]

Attest:

RUTH C. MASON
Attesting Officer

C. MARSHALL DANN
Commissioner of Patents and Trademarks